United States Patent [19]

Greenawalt

[11] 4,304,408
[45] Dec. 8, 1981

[54] SEALING RING RETENTION DEVICE

[75] Inventor: Robert G. Greenawalt, Barrington, R.I.

[73] Assignee: EG&G Sealol, Inc., Warwick, R.I.

[21] Appl. No.: 163,832

[22] Filed: Jun. 27, 1980

[51] Int. Cl.³ .............................................. F16J 15/34
[52] U.S. Cl. ........................................ 277/40; 277/48; 277/94; 277/166; 277/189; 411/353; 411/517
[58] Field of Search ................................ 277/38–43, 277/47–50, 93 SD, 94, 166, 182–184, 187, 188 R, 189; 411/516, 517, 521, 353

[56] References Cited

U.S. PATENT DOCUMENTS

| | | | |
|---|---|---|---|
| 2,888,852 | 6/1959 | Conner | 411/517 |
| 2,949,321 | 8/1960 | Tracy | 286/9 |
| 2,950,931 | 8/1960 | Englesson | 286/8 |
| 2,985,054 | 5/1961 | Bramberry et al. | 411/517 |
| 3,080,771 | 3/1963 | Baldwin | 411/517 X |
| 3,193,298 | 7/1965 | Voitik et al. | 277/40 |
| 3,198,529 | 8/1965 | Voitik | 277/3 |
| 3,239,232 | 3/1966 | Andresen | 277/38 |
| 3,245,692 | 4/1966 | Voitik | 277/40 |
| 3,647,227 | 3/1972 | Lojkutz et al. | 277/40 |
| 3,652,183 | 3/1972 | Pottharst | 277/40 X |
| 3,689,083 | 9/1972 | Greenawalt | 277/40 |
| 3,829,227 | 8/1974 | Derman | 277/94 X |
| 4,124,219 | 11/1978 | Uhrner | 277/40 |

FOREIGN PATENT DOCUMENTS

| | | | |
|---|---|---|---|
| 1034254 | 4/1953 | France | 277/93 SD |
| 852993 | 11/1960 | United Kingdom | 277/94 |

Primary Examiner—Robert S. Ward, Jr.
Attorney, Agent, or Firm—Ralph L. Cadwallader; Leo M. Kelly

[57] ABSTRACT

A sealing ring retention device for use in rotary mechanical fluid seals subjected to high fluid pressure and/or high temperature environments which utilizes unitary locking and anti-rotational structural features.

5 Claims, 6 Drawing Figures

SEALING RING RETENTION DEVICE

BACKGROUND OF THE INVENTION

1. Field of the Invention

The present invention relates to rotary mechanical fluid seals of the type used to achieve fluid tight seals between a rotary mating ring and a stationary sealing ring face and more particularly to a ring retention device useful in such seals.

2. Description of the Prior Art

Attention is called to United States Pat. Nos. 2,949,321; 2,950,931; 3,193,298; 3,198,529; 3,245,692; 3,647,227; 3,689,083; 4,124,219.

SETTING FOR THE INVENTION

U.S. Pat. No. 3,689,083 discloses a split ring retention device for use in a rotary mechanical fluid seal. This split ring retention device has tangs that extend at right angles to the plane of the ring to engage locking keys in the fluid seal to prevent, among other things, ring rotation. The present invention, however, as later discussed in detail, replaces the split ring retention device of said patent with a solid retaining ring that is flexibly deformable out of the plane thereof. The invention stems from the discovery that the ring need not be prevented from rotating so that a simpler key and ring arrangement can be employed with savings in both the fabrication of the keys and the ring, and with savings, as well, in assembly of the fluid seal.

OBJECTS OF THE INVENTION

An object of the present invention is to provide an economical mechanism for retaining fluid seal components within the housing of a rotary mechanical seal to provide a unitary structure which can be transported and later inserted into the housing of a pump, for example.

Another object is to provide in such mechanism a high-reliability retaining ring which will not become inadvertantly disengaged.

Another object is to provide a retaining ring for use with anti-rotational keys to easily form an assembly whose individual elements are sturdy and reliable.

These and still further objects will become apparent hereinafter.

SUMMARY OF THE INVENTION

The foregoing objects are achieved, generally, in a rotary mechanical seal that utilizes a retaining ring in conjunction with a plurality of anti-rotational grooved keys. The retaining ring may be machined, stamped, or otherwise formed into a continuous or solid ring (i.e., without any circumferential gap) without tangs normal to the surface. The retention ring is deformable so that it may be positioned by resilient deformation out of the plane of the ring to enter grooves of the anti-rotational grooved keys which are themselves attached to the housing of the rotary mechanical seal. After positioning, the deformed ring resumes its original shape, thereby keeping the seal in its assembled configuration. Should removal of the ring be desired, it may be deformed for easy withdrawal.

DETAILED DESCRIPTION OF THE INVENTION

Figure 1:
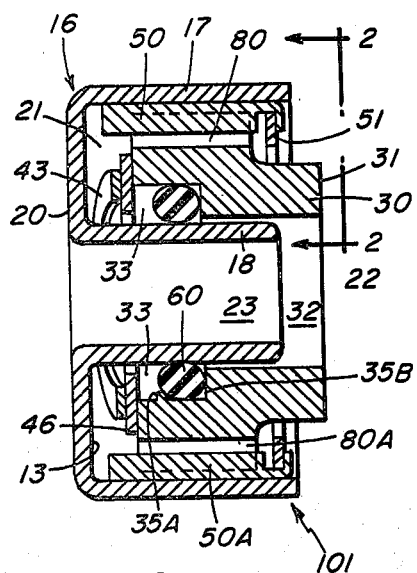
FIG. 1 illustrates a sectional view of an assembled rotary mechanical seal embodying the retaining ring of the present invention disposed in two grooved keys.
Figure 2:
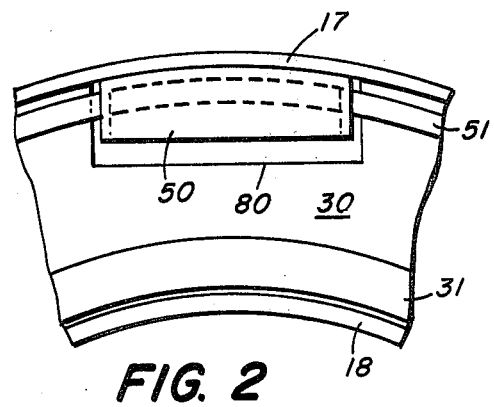
FIG. 2 is a view taken along line 2—2 of FIG. 1 looking in the direction of the arrows.
Figure 3:
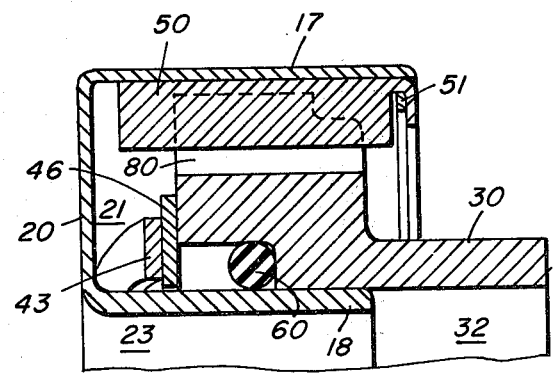
FIG. 3 is a partial view, slightly enlarged, of a portion of the seal of FIG. 1.

FIGS. 1, 2 and 3 illustrate a sectional view and partial views of a rotary mechanical seal generally indicated by the numeral 101. Seal 101 includes a unitary housing 16 having an outer shell 17, an inner shell 18, and a back wall 20 providing an annular chamber 21. The inner shell 18 has a shaft opening 23 to receive the shaft (not shown) of a pump or the like. A primary sealing ring or annulus 30 disposed within annular chamber 21 is provided with an outwardly protruding annular sealing face 31, a recess 33 having walls 35A and 35B, an axial bore 32 and two or more keyways 80 and 80A. An O-ring 60 is provided as a secondary sealing element. Axial thrust against sealing face 31 of sealing ring 30 is taken by wahser 46 which is mechanically biased by wavy spring 43. Washer 46 has an inside diameter that is larger than the outer diameter of inner shell 18.

Figure 5:
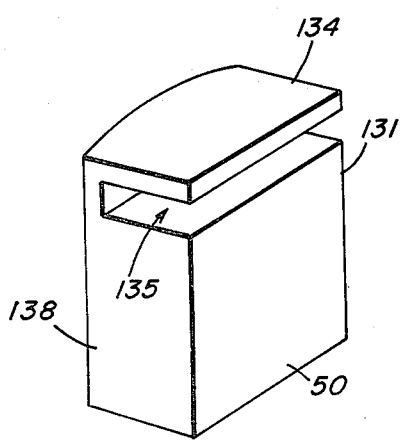
FIG. 5 is a perspective view of one of the grooved keys of FIG. 1.

Two or more anti-rotational keys 50 and 50A are secured to the inner surface of outer shell 17, as by welding, for example, preferably equally spaced within annular chamber 21. Key 50 (as shown in FIG. 5), has side surfaces 131 and 138, front surface 134 and groove 135.

In assembling the several parts spring 43 is loaded against inner surface 13 of back wall 20 of chamber 21 to apply axial forces on washer 46. Washer 46 is so spaced as to allow thermal expansion. Key slots 80 and 80A in sealing ring 30 are then aligned with keys 50 and 50A respectively and secondary sealing element, O-ring 60, and primary sealing ring 30 are joined by squeeze fitting O-ring 60 into recess 33 formed by walls 35A and 35B of sealing ring 30 and the outer surface of inner shell 18. This squeeze fit provides a fluid tight seal between sealing ring 30 and the outer surface of inner shell 18 while still allowing a relatively sliding and/or rolling movement therebetween. When the rear wall of sealing ring 30 abuts the adjacent surface of washer 46 retaining ring 51 is then deformed and placed in grooves 135 of keys 50 and 50A. Release of retaining ring 51 allows it to snap back to its original shape thereby retaining seal 101 in its assembled configuration.

Figure 4A:
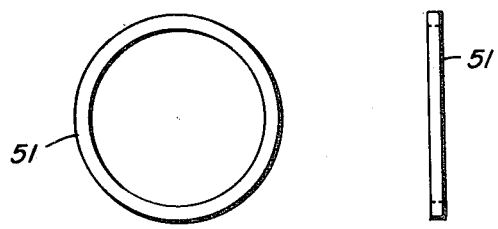
FIGS. 4A and 4B are plan and side views respectively of the retaining ring of FIG. 1.
Figure 4B:

Retention ring 51, as shown in FIGS. 4A and 4B is a thin closed-loop device. It does not have a gap and tangs extending orthogonal to the plane thereof as disclosed in U.S. Pat. No. 3,689,083. The features of the present invention ring stem from the discovery that rotation of retention ring 51 can be permitted during use, although the normally encountered radial forces inhibit rotation. A small amount of rotation has no fatal detrimental effect on operation of the seal or on either retention ring 51 or keys 50 and 50A because both can be metallurgically treated to resist abrasion. As will now be appreciated, once unit 101 is assembled, installation of retention ring 51 to retain that assembly is a simple matter. Retention ring 51, which is preferably made of a corrosion resistant, spring-type metal, is resilient enough so that it can be squeezed out of the plane of the ring to position it within grooves 135 of keys 50 and 50A. Once in position, it is allowed to spring back to its original shape as shown in FIGS. 4A and 4B. Since there are no forces arising in unit 101 which tend to deform ring 51 or to dislodge it from keys 50 and 50A, it is secure in assembly and positively retains primary sealing ring 30 in place. However retention ring 51 is easily deformed by squeezing to remove it from grooves 135 if it is necessary to remove and replace primary sealing ring 30.

The improved retaining ring herein disclosed is particularly useful in fluid seal systems of the type shown which are suitable for applications in high-volume pumps used in critical aircraft environments, for example. It results in lower cost, less tooling, and higher reliability against inadvertent disengagement. Its use permits solid keys to be employed and these solid keys can be easily hardened to provide wear resistance. Also, initial key fabrication costs are reduced as compared, for example, to channeled locking keys. In addition the retention ring and key combination shown permits use of keys with relatively deep slots—further enhancing reliability against inadvertent disengagement, but also reducing the need to maintain close dimensional tolerances.

The clearance between retaining ring 51 and outer shell 17 provides a unique path for fluid drainage. This is beneficial in severe applications.

Further modifications of the invention will be apparent to those skilled in the art and all such modifications are deemed within the scope of the invention as defined by the appended claims.

What is claimed is:

1. A rotary mechanical seal comprising:
    a unitary structure having an outer shell, an inner shell and a back wall connecting the outer shell to the inner shell and providing a chamber therebetween, the outer shell having an inner annular surface and key means secured thereto, said key means comprising a plurality of keys each having a transverse groove at its outer end;
    a primary sealing ring disposed within said chamber, said sealing ring having a plurality of key slots disposed in engagement with said plurality of keys; and
    a retention ring which is adapted to deform out of its plane for installation within the groove of each of said plurality of keys and having sufficient rigidity to assume its original ring shape upon installation within said grooves to retain said primary sealing ring within said chamber.

2. A rotary mechanical seal as claimed in claim 1, wherein each of said keys comprises a solid elongate body portion with said transverse groove formed therein to receive and secure said retention ring.

3. A rotary mechanical seal as claimed in claim 2, wherein said retention ring is a thin substantially planar device which can be squeezed to effect deformation thereof for installation in said grooves.

4. A rotary mechanical seal as claimed in claim 1 in which the retention ring is a continuous ring.

5. Sealing ring retention means forming part of a rotary mechanical fluid seal having a housing that includes an inner shell and an outer shell having an inner surface with a back wall integrally connecting the inner shell and outer shells, comprising, in combination:
    a continuous retention ring;
    a plurality of elongate keys, each of said keys having a groove to receive a portion of said retention ring and to secure said retention ring within said groove; and
    means securing said keys to the inner surface of said outer shell.

* * * * *